Figure 1:
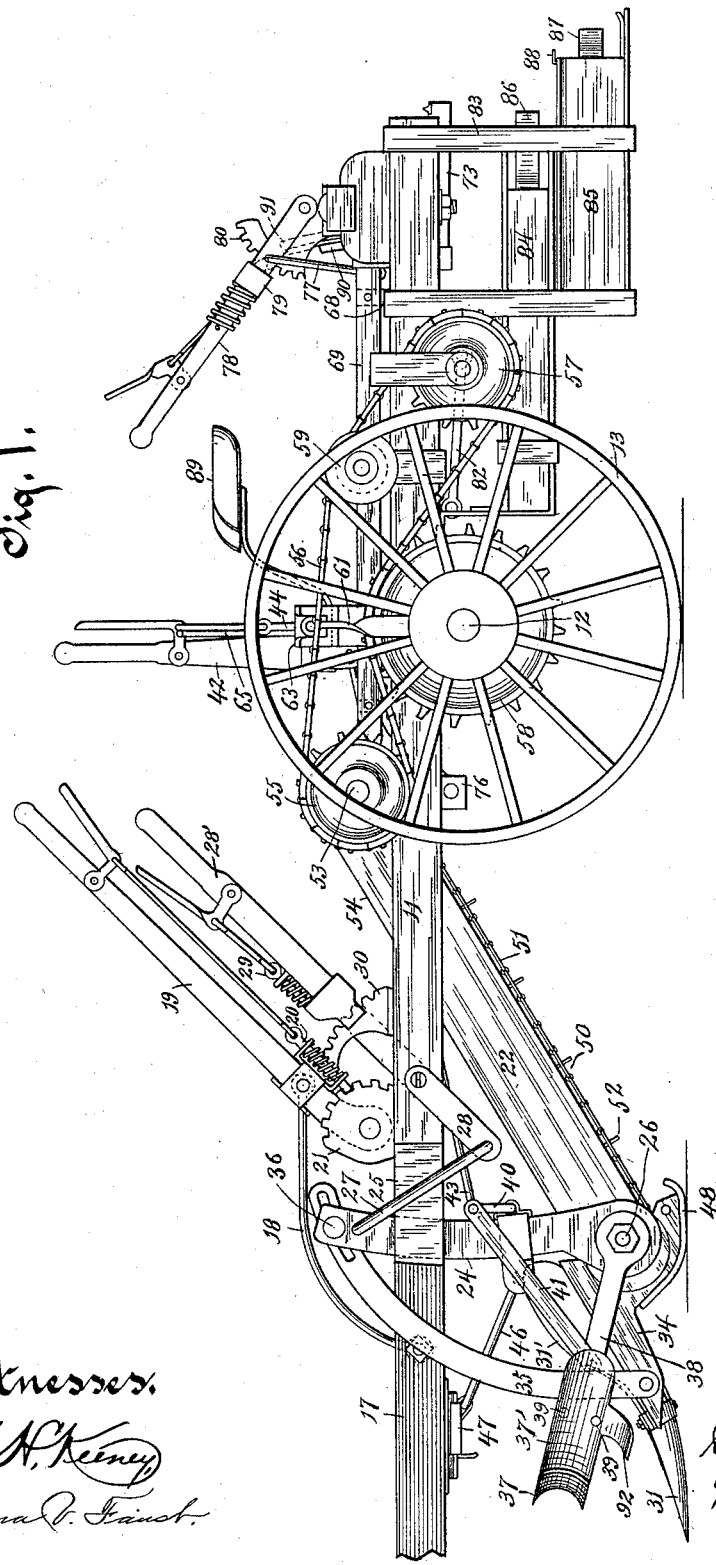

No. 612,854. Patented Oct. 25, 1898.
G. J. LIEZEN.
POTATO DIGGER.
(Application filed Sept. 29, 1896.)

(No Model.) 4 Sheets—Sheet 1.

Witnesses.
Inventor.

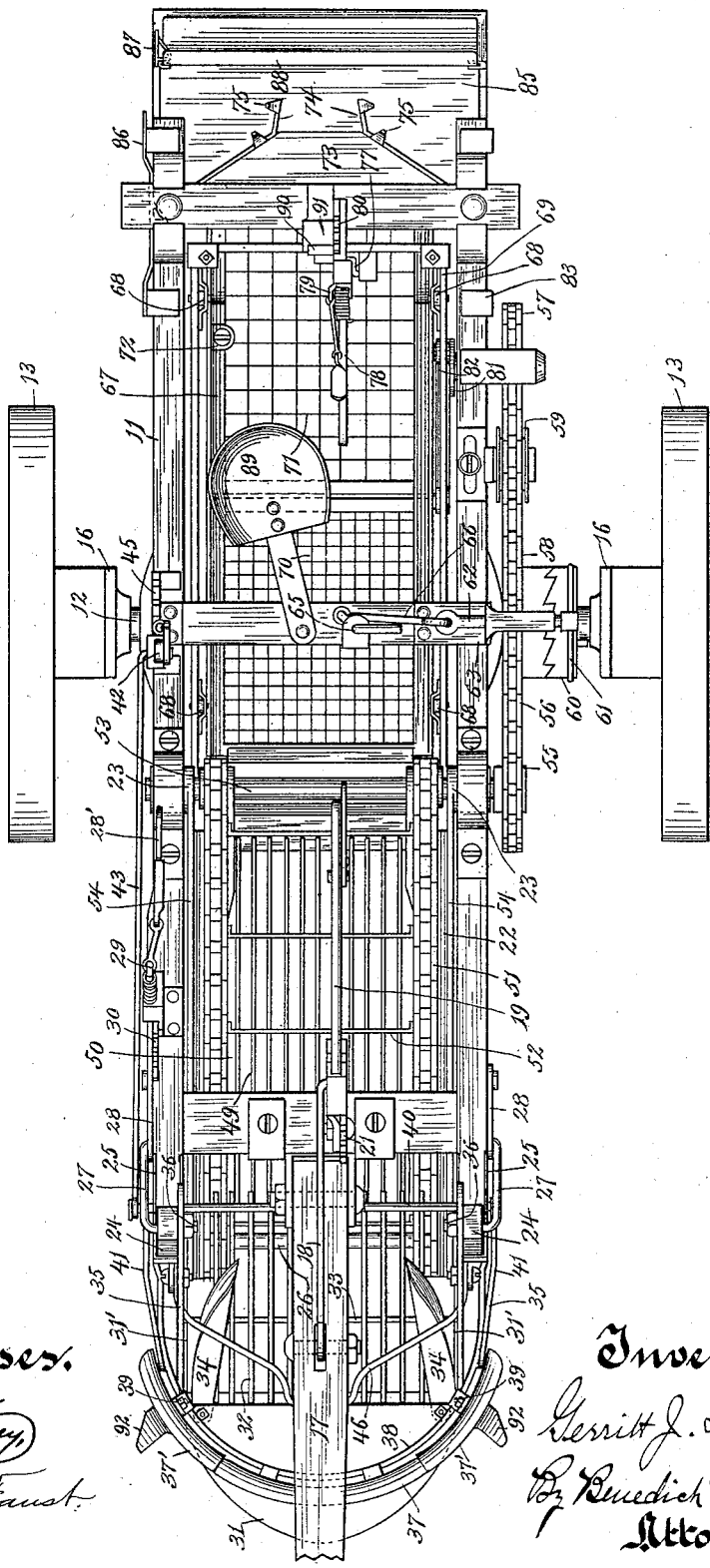

No. 612,854. Patented Oct. 25, 1898.
G. J. LIEZEN.
POTATO DIGGER.
(Application filed Sept. 29, 1896.)
(No Model.) 4 Sheets—Sheet 3.
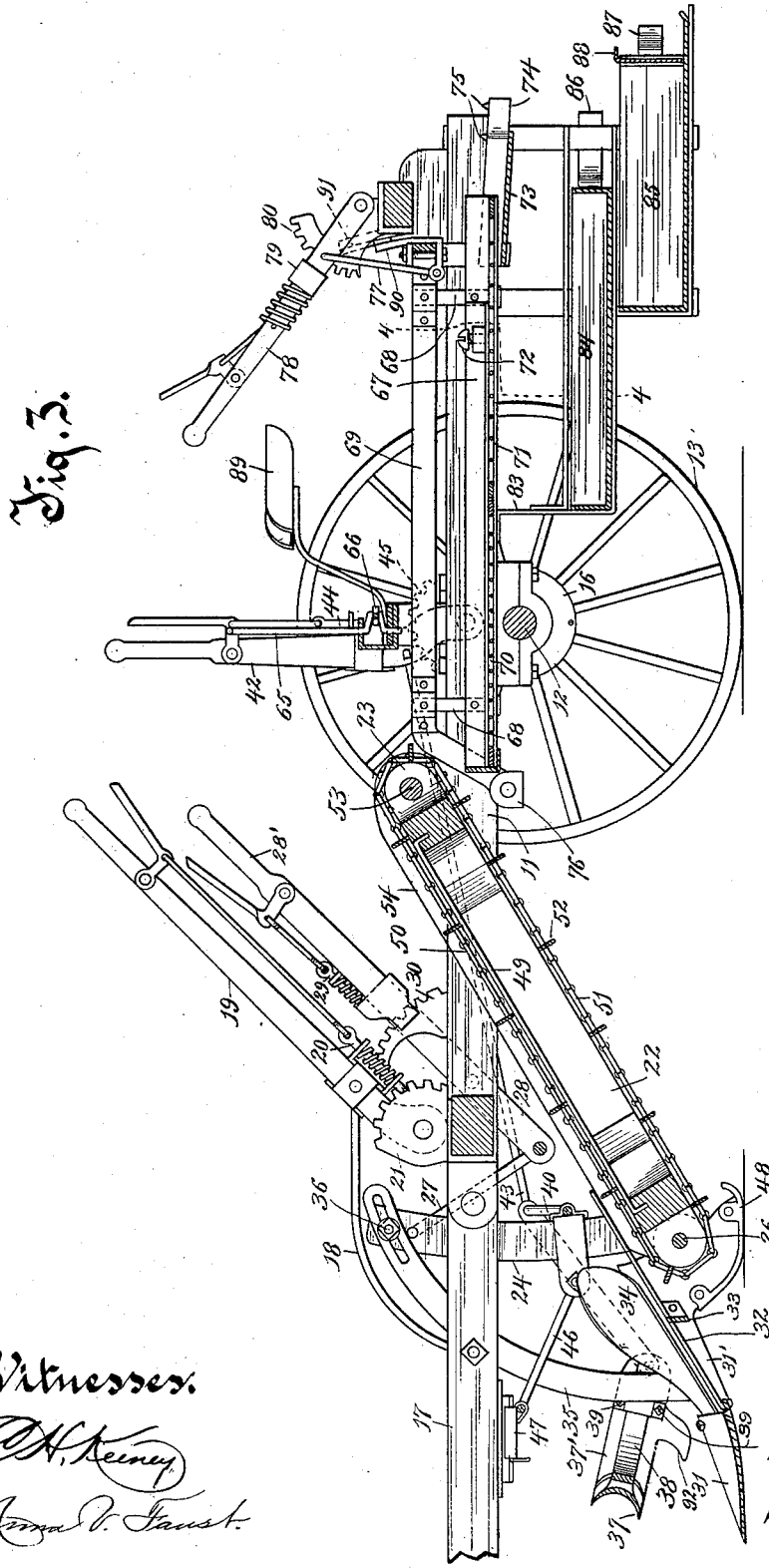

No. 612,854. Patented Oct. 25, 1898.
G. J. LIEZEN.
POTATO DIGGER.
(Application filed Sept. 29, 1896.)
(No Model.) 4 Sheets—Sheet 4.
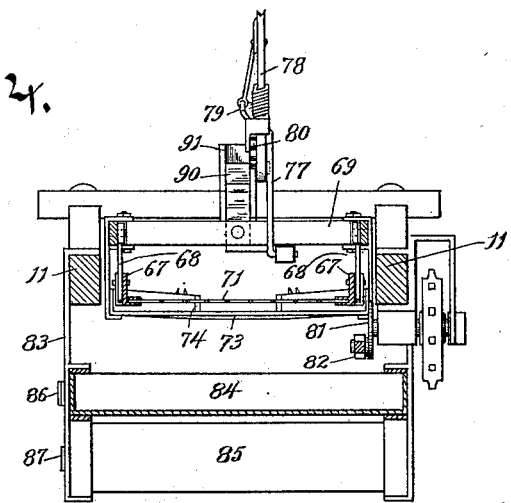
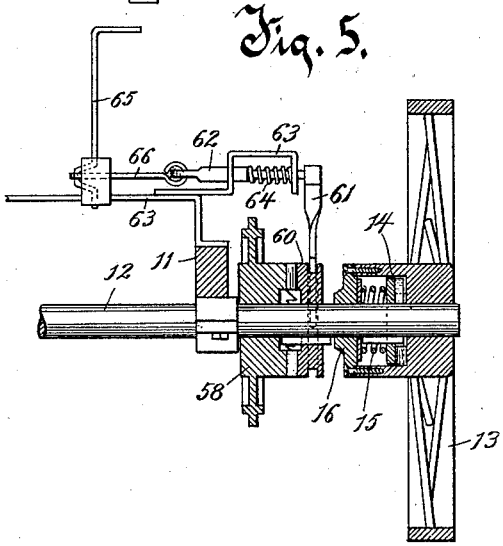
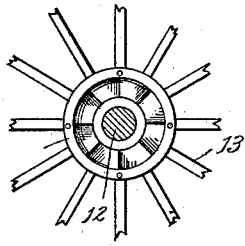
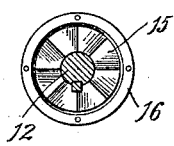
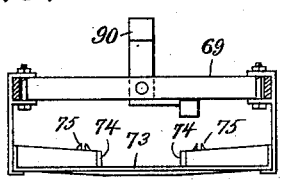
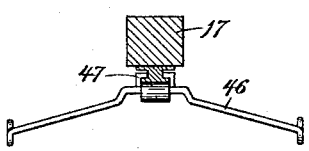
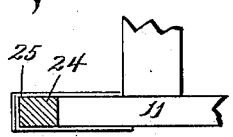
Witnesses.
Inventor.
Gerritt J. Liezen
By Benedict & Morsell
Attorneys.

UNITED STATES PATENT OFFICE.

GERRITT J. LIEZEN, OF HINGHAM, WISCONSIN.

POTATO-DIGGER.

SPECIFICATION forming part of Letters Patent No. 612,854, dated October 25, 1898.

Application filed September 29, 1896. Serial No. 607,371. (No model.)

*To all whom it may concern:*

Be it known that I, GERRITT J. LIEZEN, of Hingham, in the county of Sheboygan and State of Wisconsin, have invented a new and useful Improvement in Potato-Diggers, of which the following is a description, reference being had to the accompanying drawings, which are a part of this specification.

My invention relates to a class of machines adapted to be drawn along by a team, and being thus drawn over a field of potatoes is adapted to cut and scoop up the earth of rows or hills with the potatoes therein, to separate the vines and weeds therefrom, to sift out and drop the pulverized earth and small potatoes, to grade and separate the potatoes of larger size, and to collect them in suitable receptacles for ready removal from the machine.

The object of the invention is to secure greater convenience and efficiency and more desirable results than have heretofore been secured in machines of the general character of this one.

The invention consists of the machine, its parts and combinations of parts, as hereinafter described and claimed, or their equivalents.

In the drawings, Figure 1 is a side elevation of the complete machine. Fig. 2 is a top plan view of the machine. Fig. 3 is a longitudinal vertical section of the machine. Fig. 4 is a transverse section of the machine on line 4 4 of Fig. 3. Fig. 5 is a section of devices for connecting one of the traveling wheels operatively with the axle and with a sprocket-wheel from which parts of the machinery are driven. Figs. 6, 7, 8, 9, and 10 are details.

In the drawings, 11 is a frame of suitable size and form on which to mount the operative mechanism. An axle 12 is journaled revolubly in suitable boxes therefor secured to the under side of the frame. Traveling wheels 13 13, loose on the axle 12, support and carry the frame and most of the operative mechanism. These traveling wheels 13 are so secured to the axle 12 that when the machine is run backward they rotate freely on the axle; but when the machine is run forward they engage the axle and compel its rotation therewith. For this purpose the hub of each wheel is chambered annularly about the axle, Fig. 5, and the hub is provided with crown rack-teeth, and a clutch-collar 14, also provided with crown rack-teeth complementary to the teeth of the hub, is splined on the axle and is held yieldingly in engagement with the hub by a spring 15, coiled about the axle. The disposition of the parts is such that when the machine is run rearwardly the clutch-collar yields, moving laterally on the axle against the resistance of the spring 15, and permits the wheel to revolve on the axle. The chamber is formed in the hub of the wheel by forming a recess in the hub in its inner end and closing the chamber by a cap 16, secured to the inner end of the hub conveniently by means of screws.

The frame is provided with a tongue 17, hinged thereto, so as to have vertical movement with reference to each other, and a tongue-adjusting rod 18 is pivoted thereto at a little distance in front of the connection of the tongue to the frame, which rod extends upwardly and rearwardly from the tongue and is secured to a lever-handle 19, pivoted on the frame, by which means the tongue may be lifted or depressed, as desired. The lever-handle 19 is provided with a spring-actuated catch 20, that takes into a segmental rack 21, fixed on the frame, and locks the lever-handle in position.

An elevator-frame 22 is hinged at its rear extremity to the main frame 11 conveniently by means of laterally-projecting arbors 23 23, which have their bearings in suitable boxes therefor on the main frame. This frame 22 is inclined downwardly toward the front and is provided with segmental arms 24 24, which extend upwardly therefrom, passing movably through cap-pieces 25 25, secured to the front ends of the side rails of the main frame, which construction forms ways for the movement of these arms vertically in the front part of the frame. The arms 24 are hinged to the elevator-frame 22 conveniently by means of a pivot rod or pin 26 passing transversely through them, which is held in place by nuts on its extremities. A cranked adjusting-rod 27 has the free extremities of its cranked arms pivoted in the upper portions of the segmental arms 24, and the rod depends therefrom beneath the main frame, and the straight or shaft portion of the rod is pivoted in swinging arms 28 28, hinged on the main frame, one of which arms 28 is extended upwardly above the main frame, forming the lever-handle 28'. By this construction the front end of the elevator-frame may be raised or lowered with reference to the main frame, as desired. The lever-handle 28' is provided with a spring-actuated catch 29, that takes into a segmental rack 30, fixed on the frame, and locks the handle-bar in position.

A forwardly-projecting scoop or shovel 31 is, by means of members extending rearwardly therefrom at the sides thereof, hinged on the front end of the elevator-frame 22 by means of the pivot-rod 26, which passes through the rearwardly-extending members of the shovel. The front edge of the shovel is convex and sharp, and the shovel is preferably concave on its upper surface in cross-section. Rods fixed at their front ends to the rear edge of the shovel 31 extend parallel with each other rearwardly therefrom and form an initial grating 32, which grating is otherwise supported by means of a transverse bar 33 underneath the rod-grating and secured at its extremities to the rearwardly-projecting shovel-supporting members 31'. Inwardly flaring and twisting side guards 34, secured at their front ends respectively to the shovel at its sides, extend rearwardly therefrom and turn and twist inwardly over the grating 32, being adapted to push the upwardly-passing load inwardly toward the center of the grating. The shovel is adapted to be raised or lowered, so as to make it cut more or less deeply into the ground, by means of the segmental rods 35 35, which are pivoted to the sides thereof at their lower ends, and which rods at their upper ends are secured adjustably to the upper extremities of the segmental arms 24 by means of bolts 36.

At the front end of the machine and directly above the shovel 31 I provide a vine and weed cutter 37. This consists of a curved or segmental knife mounted on a swinging bail 38, which bail at its rear extremities is pivoted on the rod 26. This vine-cutter is preferably concave in transverse section, and the lower edge of it especially is somewhat sharp. The front central section of this vine-cutter is secured rigidly to the bail 38; but lateral extensions 37' 37' are made adjustable on the bail 38, being arranged to slide thereon partially behind the central section, and are secured thereto adjustably severally by means of a strap or straps and bolts 39. These laterally-adjustable extensions of the vine-cutter are each provided with a downwardly-extending plowshare or jointer 92, adapted to enter the ground and cut a small furrow therein, pushing the removed earth outwardly laterally therefrom. These jointers are especially adapted for clearing away the earth and vines from in front of the rods 35 and the shovel members 31'. To a limited extent they are, however, adjustable laterally on the bail 38 with the vine-cutter extensions 37', to which they are fixed. The vine-cutter and the jointers are adjustable vertically, so as to be brought nearer to or removed farther from the shovel, as desired. This vertical adjustment is accomplished by means of a doubly-cranked rod 40, pivoted above the bail 38 on the arms 24, the cranks of which rod are connected by the rods 41 to the bail 38 in front of its pivotal axis. A lever-handle 42, pivoted on the main frame, is connected by a rod 43 to a crank of the rod 40 and is adapted for oscillating the rod, and thereby raising and depressing the vine-cutter and jointers. The lever-handle 42 is provided with a spring-actuated catch 44, which takes into a segmental rack 45, fixed on the main frame, which locks the lever-handle in position.

A furcated draw-bar 46 is hinged at its rear extremities to the arms 24 and is provided at its front central portion with a thereto-pivoted head 47, which head slides freely in ways therefor on and disposed longitudinally of the tongue 17. The whiffletrees by which the team is hitched to the machine are to be attached to this head 47, so that the pull comes directly on the arms 24 and not on the tongue. The construction, however, prevents the lateral swing of the tongue.

Curved shoes 48 48 are secured to the shovel members 31' at the front end of the elevator-frame, (and substantially beneath the arms 24,) which are adapted to slide on the ground when the machine is moved ahead or rearwardly thereon. The elevator-frame 22 is provided with a longitudinal grating 49, adapted to let earth and gravel and even very small potatoes fall through it onto the ground. An endless elevator 50 travels about the frame 22, moving from front to rear on the top. The elevator has endless chains 51 at its two sides, which chains are connected together by transverse bars or buckets 52. The chains or belts of the elevator travel on the side rails of the frame as on ways, and at its lower front end they travel about the rounded front end of the frame. At the rear end of the frame the chains engage and are moved by sprocket-wheels fixed on the shaft 53, which shaft is journaled in the arbors 23. Guards 54, secured to the sides of the elevator-frame, extend upwardly a little distance therefrom and prevent undue lateral play of the elevator and also prevent the escape of the load laterally therefrom.

For operating the elevator a sprocket-wheel 55 is fixed on the shaft 53, and an endless sprocket-chain 56 runs thence over another wheel 57, mounted on the main frame, which sprocket-chain 56 runs medially on and is driven by the sprocket-wheel 58, loose on the axle 12, means being provided to clutch it to the axle in such manner as to be rotated thereby when the machine is drawn forward. An idler 59, also mounted on the main frame, supports the upper line of the chain 56 medially.

For clutching the sprocket-wheel 58 to the axle 12 the hub of the sprocket-wheel is provided with crown rack-teeth, and a clutch-collar 60, Fig. 5, splined on the axle 12, is provided with complementary crown rack-teeth adapted to engage the teeth on the hub of the wheel 58 and rotate the wheel therewith when the axle is revolving by the drawing forward of the machine. The sprocket-wheel 58 has no movement laterally on the axle, but the clutch-collar 60 has sufficient play thereon to permit it to be thrown out of engagement with the teeth of the hub of the wheel. For conveniently throwing the clutch-collar 60 into or out of engagement with the hub of the sprocket-wheel a depending furcate arm 61 rides in an annular groove therefor in the clutch-collar, the arm being fixed on a rod 62, reciprocable laterally in supports therefor in a bracket 63, fixed on the main frame. A spring 64 is adapted to draw the rod 62 inwardly, pulling the clutch-collar toward or into engagement with the hub of the sprocket-wheel. A doubly-cranked rock-shaft handle 65 is mounted in a portion of the bracket 63 that extends across the machine and is secured to the main frame, and a rod 66 connects a wrist of the crank of this handle 65 with the reciprocable rod 62, whereby the driver or attendant can readily shift the clutch-collar into or out of engagement with the sprocket-wheel. The construction is such that the crank of the rock-shaft handle 65 when shifted in either direction is thrown around beyond its center against an upwardly-extending portion of the bracket, and is thus locked in position by the effort of the spring 64.

It will be understood that the construction of the machine is such that the shovel 31 runs under and scoops up the earth of a row or series of hills of potatoes; that the earth and potatoes thus scooped up will be carried rearwardly up the initial grating 32 by the push of the continued supply of earth as the machine moves forward; that at the same time the vine-cutter 37 will separate and remove the vines, thrusting them aside laterally; that the earth and potatoes passing up and over the initial grating 32 will fall on the grating 49 of the elevator-frame; that the buckets 52 of the elevator will push the earth and potatoes rearwardly and upwardly on the grating, the earth in the meantime falling through the grating onto the ground, and that the potatoes will be discharged at the upper and rear end of the elevator. To receive the potatoes and any remaining foreign matter and to still further separate any foreign matter from the potatoes and to grade and separate the grades of potatoes, I provide suitable screening devices at the rear of the elevator. A sieve-frame 67 is suspended by depending hangers 68 from an auxiliary frame 69, pivoted at its front end to the main frame, the auxiliary frame at the sides and at the rear being located a little within, but above, the side rails of the main frame. The sieve-frame 67 is provided with longitudinal grooves or ways, in which the framed sieves 70 71 are inserted removably, being arranged to slide into and out of the frame at the rear thereof. The sieve 70 is of such mesh as adapts it to hold all the potatoes falling thereon except the very small ones, but to permit earth and gravel to drop through it, while the succeeding sieve 71 is of coarser mesh, adapted to hold the larger potatoes, but to allow the small ones to drop through it. The sieves are held detachably in position by a set-screw 72, turning through a bracket on the frame against the frame of the sieve 71. A discharging-chute 73 is secured detachably to the auxiliary frame 69, said chute being located at the rear end of the sieve-frame 67. This chute at the end of the frame is as wide as the frame, but contracts therefrom rearwardly to a narrow outlet, and brackets 74, projecting rearwardly therefrom at the sides of the outlet or discharging-mouth, are adapted to take and hold a bag thereon to receive the potatoes discharged from the chute. The brackets are provided with teeth or spines 75, adapted to take into a bag and hold it open on the brackets.

The auxiliary frame 69, with the sieve-frame 67 depending therefrom and being practically a part of one and the same frame, is, as hereinbefore stated, pivoted on the main frame at its front end conveniently in ears or brackets 76, fixed on the main frame, and at its rear end this frame is suspended by a hinged connecting-rod 77 from a lever-handle 78, pivoted on a bracket on the main frame in such manner that the frame can be raised or lowered to such inclination as desired to adapt it more or less rapidly and freely to discharge its contents rearwardly therefrom by gravity. The lever-handle 78 is provided with a spring-actuated catch 79, that takes into a segmental rack 80 and locks the lever-handle releasably in position.

The shaft or axle of the sprocket-wheel 57 is extended through its box that is secured to the under side of the side rail of the main frame and is provided with a disk 81, having an eccentric wrist-pin, to which a pitman or connecting-rod 82 is connected, which pitman at its other extremity is connected with the sieve-frame 67. The rotation of the sprocket-wheel 57 is thereby caused to reciprocate the sieve-frame and its sieves endwise, the frame oscillating on the hangers 68, depending from the auxiliary frame 69.

A subframe 83, depending from the main frame, is provided with longitudinal ledges or ways, on which boxes or drawers 84 85 are supported and from which they may be removed for emptying out their contents. The frame and the ways thereon are so constructed that the box 84 when in position is directly below the sieve 71 and is adapted to catch the small potatoes that fall through that sieve. The box is held in place releasably by a spring-catch 86 on the subframe. The box 85 when in position on the subframe is located partially beneath the box 84 and otherwise below the discharging-outlet of the chute 73. This box is also held in place releasably on the subframe by a spring-catch 87. The rear end board 88 of the box 85 is removable, being inserted at its ends in vertical ways therefor on the sides of the box. This rear end board is preferably removed when potatoes are discharged directly into bags for greater convenience in attaching and removing the bags from the machine. When bags are used to receive the potatoes, the bottom of the box 85 serves as a platform on which an attendant and the bags can stand.

A driver's seat 89 is fixed on the bracket 63, that extends transversely across the machine from side rail to side rail of the main frame. It will be noticed that the several lever-handles of the machine are all so disposed as to be within reach of the driver when on the seat 89. This arrangement and construction enable the driver to control the operation of the machine at all times and to so manipulate it as to secure the most desirable and best possible results therefrom.

A guide 90, secured to the auxiliary frame 69, is arranged to slide vertically in ways therefor in a bracket 91, fixed on the main frame. This device prevents the swaying laterally of the rear end of the auxiliary frame.

What I claim as my invention is—

1. The combination with a scoop-formed shovel mounted adjustably vertically on the front end of the frame of a potato-digger, of an initial grating extending rearwardly from the shovel, and side guards or wings secured to the shovel and extending therefrom rearwardly and curving and twisting over inwardly toward the rear.

2. The combination with a main frame mounted on traveling wheels, of an elevator-frame pivoted at its rear end to the main frame medially and extending therefrom obliquely downwardly toward the front, arms pivoted to the front end of the elevator-frame, said arms projecting therefrom upwardly and passing adjustably through the main frame, a shovel pivoted to, located in front of and adjustable vertically independently of the elevator-frame, a vine-cutter pivoted to the front of the elevator-frame and projecting above the shovel, and a cranked rod mounted on said upwardly-extending arms, rods connecting the cranks of said cranked rod to the bail or supporting member of the vine-cutter, and means for oscillating the cranked rod whereby the vine-cutter can be adjusted vertically independently of the adjustment of the elevator-frame or the shovel.

3. In a potato-digger, the combination of a main frame, an elevator-frame, axially-bored arbors or trunnions on the rear end of the elevator-frame journaled in boxes on the main frame, a shaft journaled in the arbors and provided with sprocket-wheels, and an endless elevator running about the elevator-frame on and driven by the sprocket-wheels.

4. The combination with a main frame mounted on traveling wheels, of an elevator-frame pivoted at its rear end to the main frame medially and extending therefrom obliquely downwardly toward the front, arms pivoted to the front end of the elevator-frame said arms projecting therefrom upwardly and passing adjustably through the main frame, a tongue pivoted to the main frame, a furcate draw-bar hinged to the upwardly-extending arms, and a head pivoted on the draw-bar centrally, said head being slidable longitudinally in ways therefor on the tongue.

5. In a potato-digger, the combination of a main frame, an axle revoluble in boxes on the main frame, traveling wheels revoluble on the axle, said wheels being provided with chambered hubs, slip rack-teeth on the hub, a collar having complementary slip rack-teeth splined on the axle within the hub-chamber, and a spring holding the collar releasably in engagement with the hub.

6. In a potato-digger, the combination of a main frame mounted on a loose axle provided with traveling wheels, a sprocket-wheel loose on the axle the hub of which wheel is provided with slip rack-teeth, a clutch-collar splined on the axle the collar having complementary slip rack-teeth, and means for shifting the collar into and out of engagement with the hub.

7. In a potato-digger, the combination of a main frame mounted on a loose axle provided with traveling wheels, a sprocket-wheel loose on the axle, the hub of which wheel is provided with slip rack-teeth, a clutch-collar splined on the axle, the collar having complementary slip rack-teeth, means for shifting the collar into and out of engagement with the hub, an elevator-shaft journaled on the frame, a sprocket-wheel on the shaft, and a sprocket-chain running on the sprocket-wheels on the axle and on the elevator-shaft respectively.

8. In a potato-digger, the combination of a main frame, a revoluble axle journaled therein provided with traveling wheels and a sprocket-wheel, an elevator driven by a shaft mounted on the main frame and provided with a sprocket-wheel, a third sprocket-wheel mounted on the main frame, a shaking sieve-frame connected by a pitman to the third sprocket-wheel, and a sprocket-chain running on said three sprocket-wheels.

9. In a potato-digger, the combination of a main frame, an auxiliary frame pivoted at its front end on the main frame, a sieve-frame depending movably from the auxiliary frame and means for adjusting the rear end of the auxiliary frame vertically.

10. In a potato-digger, the combination of a main frame, an auxiliary frame pivoted at its front end on the main frame, means supporting the auxiliary frame adjustably at its rear end, a sieve-frame suspended from the auxiliary frame, longitudinal ways in the sieve-frame, removable framed sieves in the sieve-frame, and a rearwardly-contracting chute secured to the sieve-frame at the rear of the sieves.

11. In a potato-digger, the combination of a main frame, an auxiliary frame pivoted at its front end on the main frame, means supporting the auxiliary frame adjustably at its rear end, a sieve-frame suspended from the auxiliary frame, a pitman or connecting-rod attached to the sieve-frame and to the wrist of a revolving disk or eccentric.

12. In a potato-digger, the combination of a main frame, a sieve suspended in the rear part of the main frame, a chute at the rear of the sieve, a subframe having ways depending from the main frame and a plurality of sliding boxes or drawers in and removable from the subframe, one drawer below the sieve and another below the outlet of the chute.

13. In a potato-digger, the combination of a main frame, an elevator-frame and elevator pivoted on the main frame, a shovel secured adjustably to the front end of the elevator-frame, an auxiliary frame pivoted and adjustable vertically on the main frame, a sieve-frame and sieves suspended movably from the auxiliary frame, a revoluble axle having traveling wheels and means driving the elevator and shaking the sieves from the axle.

In testimony whereof I affix my signature in presence of two witnesses.

GERRITT J. LIEZEN.

Witnesses:
 C. T. BENEDICT,
 ANNA V. FAUST.